US009611888B2

(12) United States Patent
Manke et al.

(10) Patent No.: US 9,611,888 B2
(45) Date of Patent: Apr. 4, 2017

(54) BEARING ARRANGEMENTS IN A REFRIGERATION RECIPROCATING COMPRESSOR

(71) Applicant: Whirlpool S.A., São Paulo—Sp (BR)

(72) Inventors: Adilson Luiz Manke, Joinville (BR); Rinaldo Puff, Joinville (BR); Diego Sacomori, Joinville (BR)

(73) Assignee: Whirlpool S.A., São Paulo-Sp (BR)

( * ) Notice: Subject to any disclaimer, the term of this patent is extended or adjusted under 35 U.S.C. 154(b) by 0 days.

(21) Appl. No.: 14/432,306

(22) PCT Filed: Aug. 1, 2013

(86) PCT No.: PCT/BR2013/000383
§ 371 (c)(1),
(2) Date: Mar. 30, 2015

(87) PCT Pub. No.: WO2014/053036
PCT Pub. Date: Apr. 10, 2014

(65) Prior Publication Data
US 2015/0267743 A1  Sep. 24, 2015

(30) Foreign Application Priority Data
Oct. 1, 2013  (BR) .......................... 10 2012 025039

(51) Int. Cl.
F16C 33/22  (2006.01)
F16C 25/04  (2006.01)
(Continued)

(52) U.S. Cl.
CPC .............. *F16C 25/04* (2013.01); *F04B 9/045* (2013.01); *F04B 39/0094* (2013.01); *F16C 3/22* (2013.01);
(Continued)

(58) Field of Classification Search
CPC ...... F16C 3/08; F16C 3/14; F16C 3/22; F16C 9/03; F16C 9/045; F16C 17/02;
(Continued)

(56) References Cited

U.S. PATENT DOCUMENTS 1,347,443 A * 7/1920 Christiani ............... F16C 25/04
384/626
2,703,737 A * 3/1955 Turner .................... F16C 25/04
384/425

(Continued)

FOREIGN PATENT DOCUMENTS

WO      9734088 A1    9/1997
WO   2009027435 A1    3/2009

(Continued)

OTHER PUBLICATIONS

International Search Report and Written Opinion, International Application No. PCT/BR2013/000383, International filing date, Oct. 1, 2013.

Primary Examiner — James Pilkington
(74) Attorney, Agent, or Firm — Dinsmore & Shohl LLP

(57) ABSTRACT

The compressor comprises: a crankcase (10) carrying a cylinder (20) and a bearing hub (40) having a first and a second end portions (40a, 40b) and defining a radial bearing (41), in which is housed a crankshaft (50); and a connecting rod (60) coupled to a piston (30) housed in the cylinder (20) and having a larger eye (61) mounted in an eccentric end portion (55) of the crankshaft (50). Each of said end portions (40a, 40b) is defined by a bushing extension (45, 46) affixed in the interior of the bearing hub (40) and having an end portion (45a, 46a) projecting outwards from the bearing hub (40), in order to be elastically and radially deformed when pressed by a confronting portion of the crankshaft (50), (Continued)

which presents coaxiality deviation in relation to the axis (X1) of the radial bearing (41).

12 Claims, 5 Drawing Sheets

(51) Int. Cl.
F04B 39/00 (2006.01)
F16C 3/22 (2006.01)
F16C 33/10 (2006.01)
F16C 33/12 (2006.01)
F16C 33/20 (2006.01)
F04B 9/04 (2006.01)
F16C 9/03 (2006.01)
F16C 3/08 (2006.01)
F16C 3/14 (2006.01)

(52) U.S. Cl.
CPC ............... *F16C 9/03* (2013.01); *F16C 33/10* (2013.01); *F16C 33/106* (2013.01); *F16C 33/1025* (2013.01); *F16C 33/121* (2013.01); *F16C 33/125* (2013.01); *F16C 33/128* (2013.01); *F16C 33/20* (2013.01); *F16C 33/205* (2013.01); *F16C 3/08* (2013.01); *F16C 3/14* (2013.01); *F16C 2208/20* (2013.01); *F16C 2208/58* (2013.01)

(58) Field of Classification Search
CPC .......... F16C 17/03; F16C 25/04; F16C 33/10; F16C 33/1025; F16C 33/106; F16C 33/121; F16C 33/125; F16C 33/128; F16C 33/20; F16C 33/205; F16C 2208/20; F16C 2208/52; F16C 2360/42; F16C 2360/43; F16C 2362/52; F04B 35/04; F04B 39/0094; F04B 39/023; F04B 39/0276; F04B 39/122
USPC .................................................. 417/415, 902
See application file for complete search history.

(56) References Cited

U.S. PATENT DOCUMENTS

| 4,828,403 | A | * | 5/1989 | Schwartzman | ......... F16C 17/10 384/100 |
| 5,052,825 | A | | 10/1991 | Battig | |
| 2013/0323030 | A1 | * | 12/2013 | Manke | ............... F04B 39/0094 415/170.1 |

FOREIGN PATENT DOCUMENTS

| WO | 2010079885 | A2 | 7/2010 |
| WO | 2011022799 | A1 | 3/2011 |

* cited by examiner

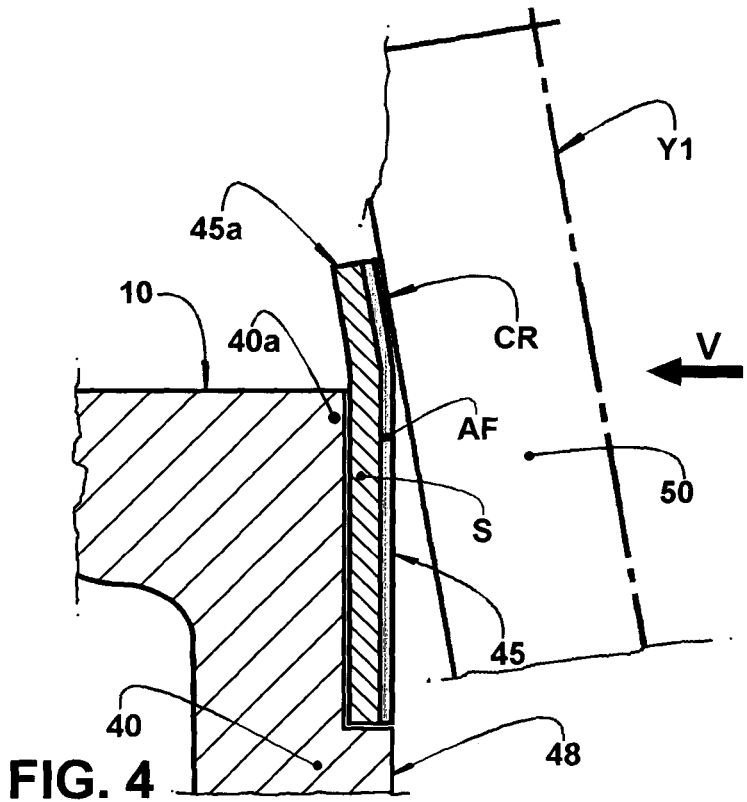
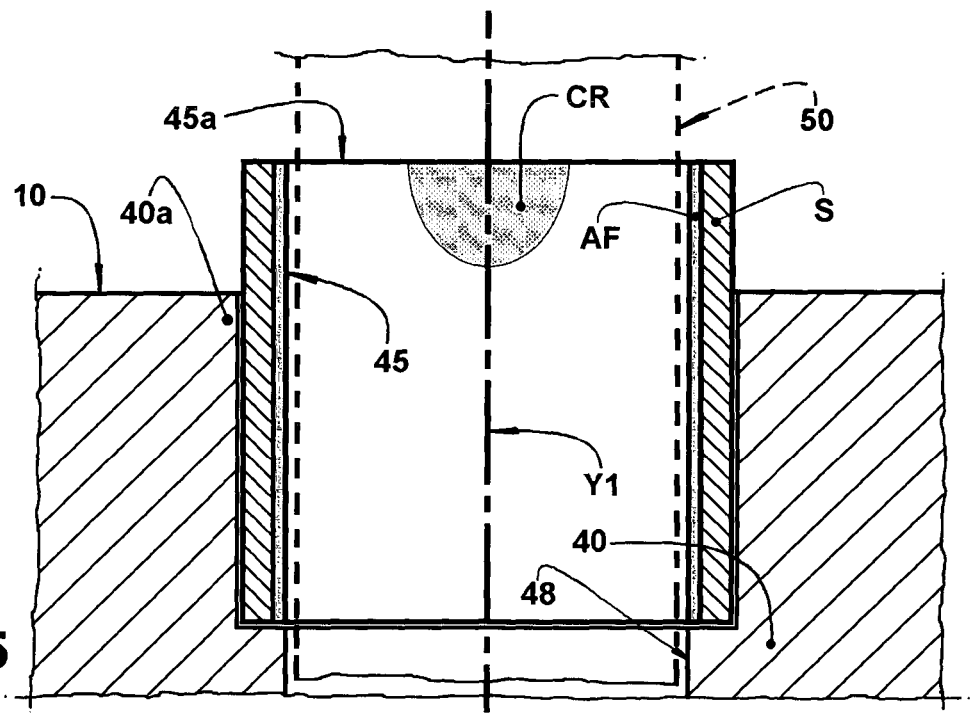

BEARING ARRANGEMENTS IN A REFRIGERATION RECIPROCATING COMPRESSOR

CROSS-REFERENCE TO RELATED APPLICATIONS

This application is the U.S. national phase of PCT/BR2013/000383 filed Aug. 1, 2013, which claims priority of Brazil Patent Application 10 2012 025039 0 filed Oct. 1, 2012, which is incorporated herein by reference.

FIELD OF THE INVENTION

The present invention refers to bearing arrangements introduced in radial bearing regions associated with the crankshaft of a refrigeration reciprocating compressor, either hermetic or not, in order to allow said radial bearing regions to undergo a controlled deformation, so as to compensate, at least in part, for the deviations in the nominal relative positioning of the cooperating parts, caused by misalignments in the manufacture or assembly of said cooperating parts, or by forces acting thereon and resulting from the operation of the electric motor of the compressor or from compression of the refrigerant gas.

PRIOR ART

A conventional construction for the refrigeration compressor of the reciprocating type is illustrated in FIG. 1 of the enclosed drawings and comprises, in the interior of a shell (not illustrated), a crankcase 10 which carries a cylinder 20, inside which reciprocates a piston 30.

The crankcase 10 is also provided with a bearing hub 40 which defines, internally, a radial bearing 41 in which is mounted a crankshaft 50 which incorporates an eccentric end portion 55, projecting outwardly from a first end portion 40a of the bearing hub 40 and operatively coupled to the piston 30, by means of a connecting rod 60, and a free end portion 56 which projects outwardly from a second end portion 40b of the bearing hub 40.

Around the eccentric end portion 55 of the crankshaft 50 is mounted a larger eye 61 of the connecting rod 60, whose smaller eye 62 is coupled to the piston 30, by a piston pin 63. The free end portion 56 of the crankshaft 50, which projects outwards from the bearing hub 40, is coupled to a rotor 71 of an electric motor 70, having a stator 72 attached to the crankcase 10. The rotor 71 of the electric motor 70 rotates the crankshaft 50, impelling the piston 30, by means of a connecting rod 60, in a reciprocating movement.

The end of the cylinder 20, opposite to the connecting rod 60, is closed by a valve plate (not illustrated), provided with at least one suction valve and a discharge valve, according to any adequate construction known in the prior art or not.

A first problem related to these compressors results from the process employed to carry out the machining operations in the crankcase 10, in order to form the cylinder 20 and the radial bearing 41, in the crankshaft 50 and also in the eyes of the connecting rod 60. Regardless of the economically feasible type of said process, position errors will always occur, in greater or lesser extent, such as those which cause loss of orthogonality between the axis of the crankshaft 50 and the axis of the piston 30 of the mounted assembly. The positioning errors mentioned above are responsible for localized contacts between the piston 30 and the cylinder 20, between the piston pin 63 and the smaller eye 62 of the connecting rod 60, between the larger eye 61 of the connecting rod 60 and the eccentric portion 55 of the crankshaft 50, and also between the latter and the radial bearing 41 machined in the bearing hub 40 of the crankcase 10.

A second problematic feature, related to the compressor type considered herein and described above, is due to the fact that, during compression of the gas in the cylinder 20, the compression force F, which actuates against the top of the piston 30, is transmitted to the connecting rod 60 and to the eccentric portion 55 of the crankshaft 50, generating deformations in the mechanical assembly, which cause the misalignment of the eccentric portion 55 of the crankshaft 50 in relation to the axis of the larger eye 61 of the connecting rod 60, and of the crankshaft 50 in relation to the axis of the radial bearing 41, increasing the problems of localized contacts mentioned above which result from position errors in the manufacture and assembly of the component parts, and producing wear and high energy consumption.

In this known construction, during compression of the gas in the cylinder 20, the compression force F, which actuates against the top of the piston 30 is transmitted, by the connecting rod 60, to the end portion 61a of the larger eye 61, generating a reaction in the eccentric end portion 55 of the crankshaft 50, which is transmitted, by the crankshaft 50, to the radial bearing 41 of the bearing hub 40, in the first and second end portion 40a, 40b of the latter, producing thereon a first and a second reaction forces F1, F2, derived from the compression force F, the first reaction force F1 being more intense and harmful to the maintenance of the oil film between the crankshaft 50 and the radial bearing 41, in the first end portion 40a, of the bearing hub 40, positioned closer to the axis of actuation of the compression force F.

The forces mentioned above, in the presence of the radial gaps between the crankshaft 50 and the radial bearing 41, inherent to the sliding bearings, produce the so-called misalignment of the crankshaft 50. Considering an ideal situation of high rigidity of the mechanism components with said misalignment of the crankshaft 50, the first end portion 40a and, in a much lesser extent, the second end portion 40b of the bearing hub 40, are those in which the radial bearing 41 supports the load and the moments imposed to the bearing hub 40, which causes the same wear problems by localized contact and high energy consumption mentioned above.

A third aspect to be considered in these compressors is related to the stator 72, when it presents concentricity deviations in relation to the radial bearing 41 of the bearing hub 40, and also to the rotor 71 when it presents radial errors in its positioning. During the starts of the electric motor 70, presenting said deviations and errors, magnetic radial forces on the rotor 71 are produced, causing localized wear in the radial bearing 41, in the second end portion 40b of the bearing hub 40. Besides this inconvenience, the highest contact forces, between the crankshaft 50 and the second end portion 40b of the bearing hub 40, require a higher torque from the motor 70 to start the movement, that is, a higher motor power, thus increasing the minimum starting voltage.

There are known constructions provided with a region which may be radially and elastically deformed, in the first end portion of the bearing hub, which region is obtained by a circumferential groove or cutout provided in the bearing hub.

In this known construction, the first end portion of the bearing hub may present a certain compliance, and may be radially and elastically deformed by the localized pressure exerted by the confronting region of the crankshaft, at the final phase of the compression stroke of the piston, in order to accommodate to the surface of the crankshaft, avoiding a punctual contact and the interruption of the thick oil film between the crankshaft and the bearing hub in the first end portion of the latter.

Although said previous construction provides a compliant region in the bearing hub 40, it deals only with the interruption of the oil film in the first end portion 40a of the bearing hub 40, on which are applied, by the crankshaft 50, the highest forces derived from the compression of the refrigerant gas by the piston.

In the operational condition in which the compliant region (with a controlled elastic deformation) of the first end portion 40a of the bearing hub 40 is elastically deformed by the pressure exerted by the crankshaft 50, the latter and, consequently, its end portion 55, tend to occupy a position in which its axis presents a certain inclination relative to the axis of the bearing hub 40 and of the larger eye 61 of the connecting rod 60. Said inclination of the crankshaft 50 and of its eccentric portion 55 tends to cause interruption of the oil film in the end portion 61a of the larger eye 61 of the connecting rod 60, facing the crankcase 10.

The compliance (elastic deformation) of the first end portion 40a of the bearing hub 40, according to the previous construction, is not able to eliminate, neither the problem of the accentuated wear in said end portion of the larger eye 61 of the connecting rod 60, nor the transmission, by the latter, of forces on the piston 30, forcing it radially against the cylinder 20.

Another aspect not considered by said previous construction is the increase of torque of the electric motor 70, and the wear by localized contact in the second end portion 40b of the bearing hub 40, at starts of the electric motor 70 with the rotor 71 presenting concentricity deviations in relation to the stator 72.

Said previous construction is only directed to the maintenance of the oil film in the radial bearings of a refrigeration reciprocating compressor, considering only the problem of the lubrication deficiency and accentuated wear in the first end portion 40a of the bearing hub 40.

Besides providing only the possibility of compliance in a region of the first end portion 40a of the bearing hub 40, the prior art requires additional machining and finishing operations in the crankcase 10, for forming the region which is capable to present the compliance, and also for forming the end radial bearing extensions to be defined in the bearing hub 40. It should also be observed that the formation of the compliant region and of the radial bearing regions directly in the crankcase 10 is also costly, requiring precise dimensional adjustments in the machining and finishing operations for each type of compressor, making difficult to use variations of the usual cylindrical shape of the radial bearing regions in the bearing hub 40.

On account of the problems regarding localized wear, high energy consumption, increase of the starting voltage of the electric motors, and the complexity and limitation of the specific machining operations in the crankcase 10, it is desirable to provide a technical solution, to be applied to the bearing of the crankshaft of a refrigeration reciprocating compressor, and which can eliminate, or at least minimize, the inconveniences caused by the positioning error of the crankshaft, both at the start and during operation of the compressor, as well as the complex and specific machining operations of the crankcase 10 for each compressor model.

SUMMARY OF THE INVENTION

In view of the operational problems mentioned above, the present invention has the object of providing bearing arrangements in a refrigeration reciprocating compressor, of the type discussed above, which allow simplifying the provision of bearing regions and avoiding, or at least reducing, the wear, by localized contact, of the radial bearing regions of the crankshaft in relation to the end portions of the bearing hub.

More specifically, the present invention has the object of avoiding, or at least reducing, said wear, compensating, at least partially, for the coaxiality deviations of the crankshaft in relation to the radial bearing in the bearing hub, and which are generally caused by geometric deviations during manufacture and assembly of said movable cooperating parts, by the compression forces of the refrigerant gas, or also by the magnetic radial forces of the rotor of the electric motor, particularly at the start of the latter.

An additional and complementary object of the present invention is to provide bearing arrangements, as mentioned above, which allow simplifying the provision of bearing regions and avoiding, or at least reducing, the wear, by localized contact, of the radial bearing regions of the crankshaft in relation to the larger eye of the connecting rod, avoiding, or at least reducing, said wear, by compensating, at least partially, for the coaxiality deviations of the crankshaft in relation to the larger eye of the connecting rod.

The present arrangements are applied to a refrigeration reciprocating compressor of the type which comprises a crankcase carrying a cylinder, in which is housed a piston, and a bearing hub defining a radial bearing, housing a crankshaft having an eccentric end portion and a free end portion, which portions project outwards from a first and a second end portion, respectively, of the bearing hub.

The compressor further comprises a connecting rod, having an end defining a larger eye, which is mounted in the eccentric end portion of the crankshaft, and an opposite end coupled to the piston, by a coupling means, and an electric motor having a rotor mounted to the free end portion of the crankshaft and a stator attached to the crankcase, around the rotor.

According to the present invention, the first and second end portion of the bearing hub are each defined by a respective bushing extension affixed in the interior of the bearing hub, and presenting an end portion, which projects axially outwards from the bearing hub, so as to be elastically and radially deformed outwardly when pressed by a confronting portion of the crankshaft presenting a coaxiality deviation of its axis in relation to the axis of the radial bearing.

Also according to the invention, the end portion of the larger eye of the connecting rod, turned to the crankcase, may be defined by a bushing extension fixed in the interior of the larger eye and presenting an end portion, which projects axially outwards from the larger eye, so as to be elastically and radially deformed outwardly when pressed by a confronting portion of the crankshaft, which presents a coaxiality deviation of its axis in relation to the axis of the larger eye.

The construction proposed by the present invention allows substantially improving the bearing conditions, not only of the crankshaft, but also of its eccentric end portion, in the bearing hub and in the larger eye of the connecting rod, respectively, thus reducing localized wear, efficiency loss, and avoiding the increase of the starting torque in the operation of the compressor.

It should be further noted that any of said end portions of the bearing hub and of the large eye of the connecting rod, with reduced thickness, can be easily obtained without using special machining in the crankcase, in the case of the bearing hub, and without using special geometries in the process of compressing the connecting rod produced by sintering, by using bushing extensions fixed in the interior of the bearing hub and of the larger eye. The elastic radial deformation of said end portions with reduced thickness may occur due to the direct contact of the two surfaces, or by force transfer through a field of distributed pressures generated in the oil film and which separates, totally or partially, the two surfaces, an effect known as elastohydrodynamic lubrication.

BRIEF DESCRIPTION OF THE DRAWINGS

The invention will be described below, with reference to the enclosed drawings, given by way of example and in which:

FIG. 4 represents an enlarged and partial simplified vertical sectional view of the crankshaft portion, which presses and elastically and radially deforms, outwardly, the first end portion of the bearing hub, constructed according to a constructive variant for the bushing, according to the present invention;

FIG. 5 represents a simplified front view of the region of the first end portion of the bearing hub illustrated in FIG. 4, said view being taken in the direction of arrow V of the previous figure, with the crankshaft illustrated in dashed lines.

DETAILED DESCRIPTION OF THE INVENTION

Figure 1:
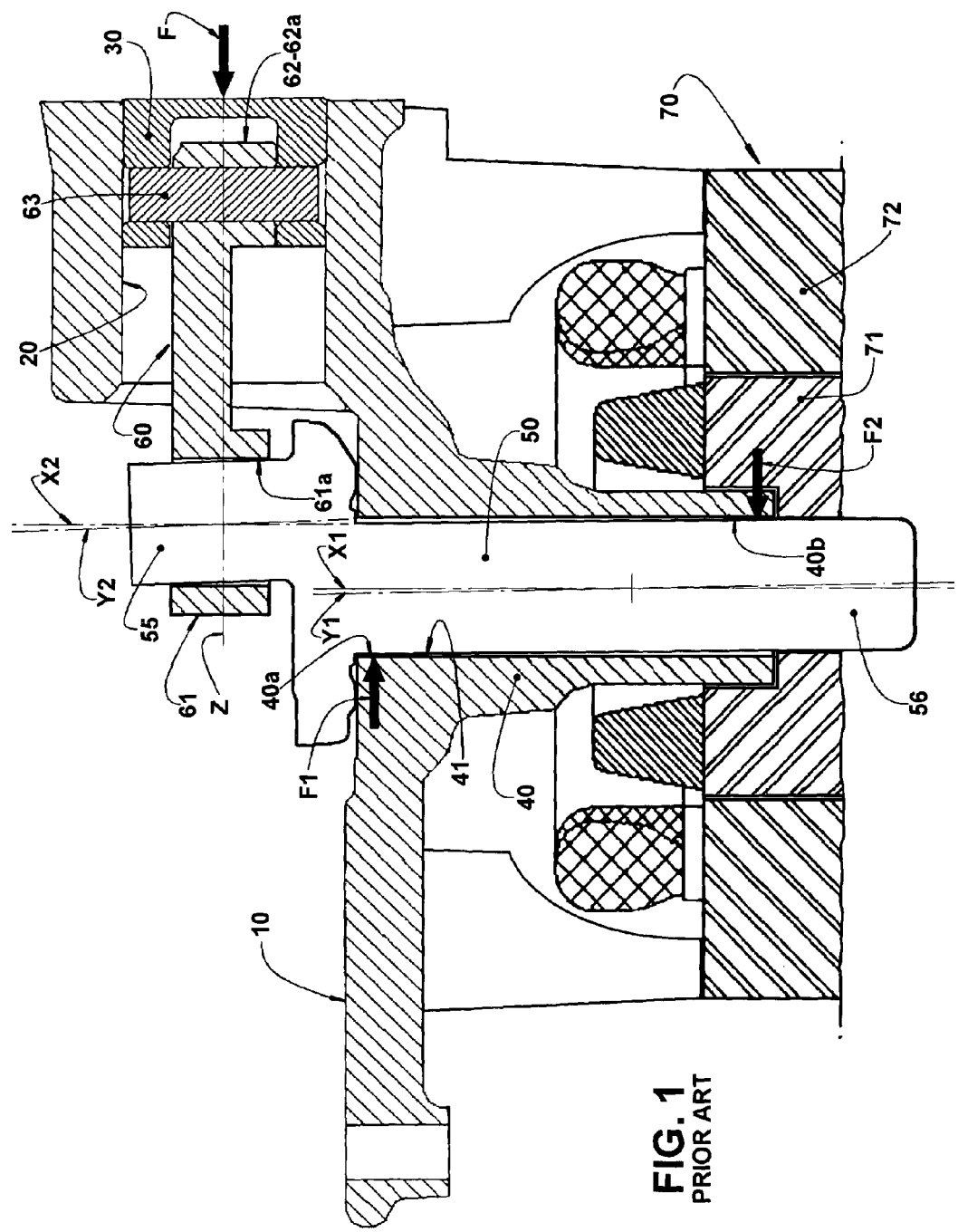
FIG. 1 represents a simplified vertical sectional view of a refrigeration compressor of the type considered herein, with the radial bearings of the crankshaft being constructed according to the prior art, and further illustrating, in an enlarged way, the crankshaft angularly inclined in relation to the axis of the radial bearing, defined in the bearing hub, and to the axis of the larger eye of the connecting rod.
Figure 2:
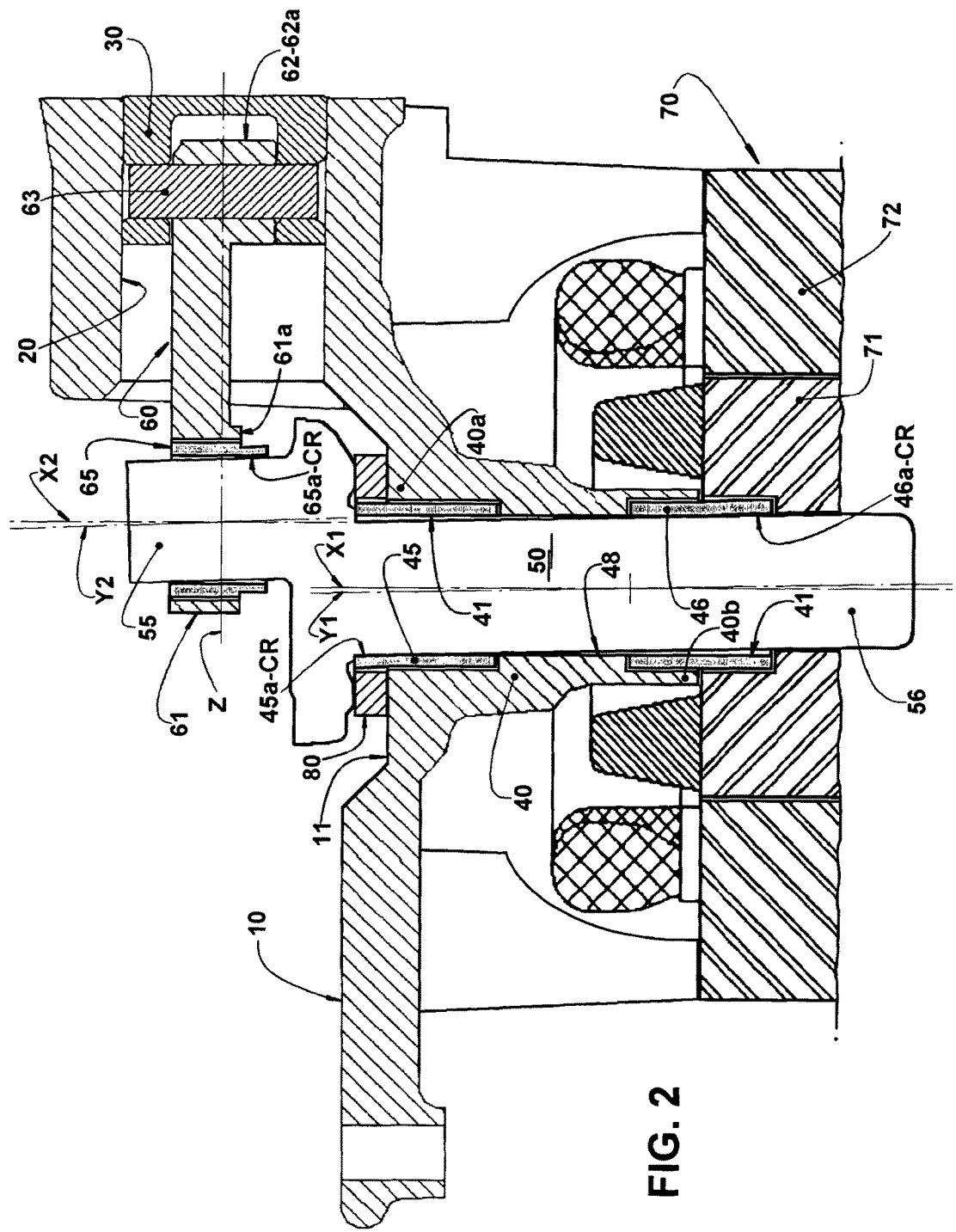
FIG. 2 represents a view similar to that of FIG. 1, but illustrating the radial bearings, of the crankshaft, constructed according to the invention, the crankshaft being inclined in relation to the axis of the bearing hub and of the larger eye of the connecting rod.

As already previously described and illustrated in FIGS. 1 and 2 of the enclosed drawings, the bearing arrangements of the present invention are applied to a refrigeration compressor of the type which comprises, in the interior of a shell (not illustrated), a crankcase 10 defining, generally in a single cast piece, a cylinder 20 having an axis Z, and a bearing hub 40 which defines, internally, a radial bearing 41 having an axis X1.

A crankshaft 50, having an axis Y1, is mounted in the interior of the radial bearing 41 of the bearing hub 40 and has an eccentric end portion 55, with an axis Y2 projecting outwards from a first end portion 40a of the bearing hub 40, and a free end portion 56 which projects outwards from a second end portion 40b of the bearing hub 40.

A piston 30 is housed in the cylinder 20, so as to be displaced therein, in a reciprocating movement, by a connecting rod 60 which has an end defining a larger eye 61, mounted around the eccentric end portion 55 of the crankshaft 50, and an opposite end carrying a coupling means 62 to allow coupling the connecting rod 60 to the piston 30. The coupling means 62 can take the form of a smaller eye 62a, of a spherical joint (not illustrated), or any other means capable of carrying out the connecting rod-piston coupling.

In the illustrated construction, the smaller eye 62a is coupled to the piston 30, by means of a piston pin 63, the crankshaft 50 being rotatively driven by an electric motor 70 which comprises a rotor 71, mounted to the free end portion 56 of the crankshaft 50, and a stator 72 attached to the crankcase 10, around the rotor 71.

As mentioned above, the piston pin 63 and the smaller eye 62a of the connecting rod 60 can be replaced by a piston-connecting rod assembly having a spherical joint, or any other coupling arrangement, without departing from the constructive concept of the present invention.

The parts of crankcase 10 and crankshaft 50 may be constructed in any adequate well known prior art material as, for example, aluminum or cast iron alloys for the crankcase 10, and steel or cast iron alloys for the crankshaft 50.

Figure 3:
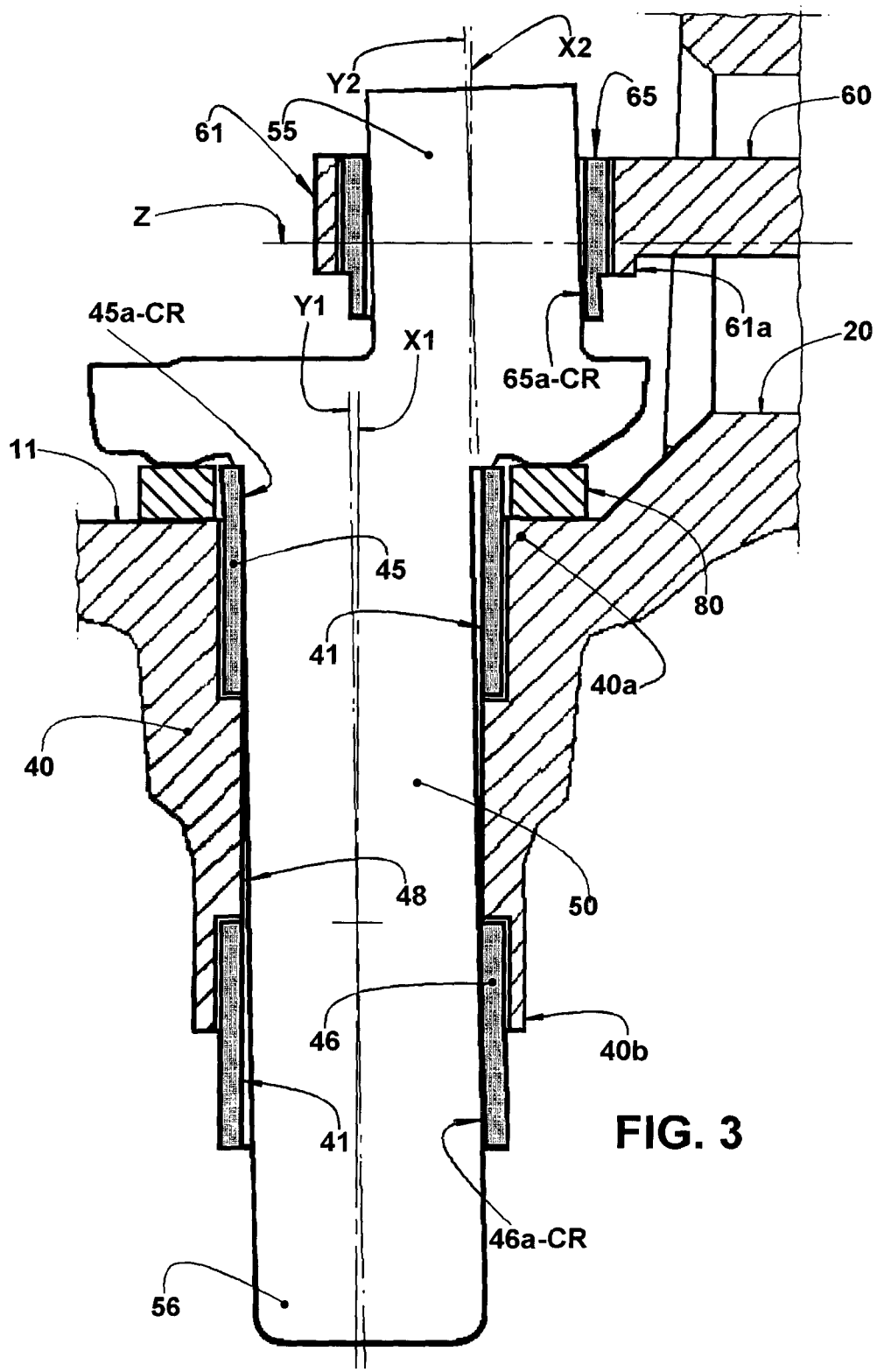
FIG. 3 represents an enlarged detail of the part of FIG. 2 which illustrates the radial bearings of the crankshaft.

Although FIG. 3 does not illustrate the cylinder, the piston, part of the connecting rod and the electric motor, it should be understood that such parts were suppressed only for purposes of simplification of said figure, since they are already part of the type of compressor to which the present bearing arrangements are applied.

In an ideal condition for the assembly and operation of the compressor (not illustrated), the axis Y1 of the crankshaft 50 coincides with the axis X1 of the radial bearing 41 of the bearing hub 40, and the axis X2 of the larger eye 61 of the connecting rod 60 coincides with the axis Y2 of the eccentric end portion 55 of the crankshaft 50. In this ideal condition, the axes Y1 and Y2 of the crankshaft 50 and of its eccentric end portion 55 are orthogonal to the axis Z of the cylinder 20.

As already mentioned in the introduction of the present specification, position errors will always occur, in greater or lesser extent, in the construction of the components and in the assembly of the compressor, which cause some misalignment of the axes Y1 and Y2 of the crankshaft 50 and of its eccentric end portion 55 in relation to the axes X1 and X2 of the radial bearing 41 and of the larger eye 61 of the connecting rod 60, as well as loss of orthogonality between the axes Y1 and Y2 of the crankshaft 50 and of its eccentric end portion 55 in relation to the axis Z of the cylinder 20.

In addition to the position errors mentioned above, it should be further considered the effects of the compression force F transmitted to the eccentric end portion 55 of the crankshaft 50 and which tends to cause deformation of the mechanism components and misalignment between the axes of the parts involved in these bearing regions, causing high levels of wear and energy consumption, as previously mentioned.

To the problems cited above, related to the position errors and to the compression forces, it can be added the problem of misalignment of the portions of crankshaft 50 in relation to the radial bearing 41 and to the larger eye 61, upon start of the electric motor 70 with its stator 72 presenting concentricity deviations in relation to the radial bearing 41, defined in the bearing hub 40.

Said position and coaxiality errors, between the stator 72 and the radial bearing 41, and also the compression forces of the refrigerant gas, cause the positioning error of the crankshaft 50 and of its eccentric end portion 55, respectively, in the interior of the radial bearing 41 and of the larger eye 61 of the connecting rod 60, as illustrated in FIGS. 1, 2 and 3.

In the conventional constructions of the radial bearing parts, as illustrated in FIG. 1, the positioning error of the crankshaft 50 and of its eccentric end portion 55, in the interior of the radial bearing 41 and of the larger eye 61 of the connecting rod 60, respectively, causes the crankshaft 50 to have circumferential portions of its surface with small dimensions, in the axial and circumferential directions, seated only on end circumferential regions, with small axial and circumferential dimensions, of the first and second end portions 40a, 40b of the bearing hub 40, and of the end portion 61a of the larger eye 61 of the connecting rod 60, since these mutual contact regions or practically punctual bearing regions, under positioning error of the crankshaft, do not accommodate to the angular misalignment of the crankshaft in relation to the part of the radial bearing which supports said crankshaft.

Even in the cases in which it is provided, in the first end portion 40a of the bearing hub 40, an elastically deformable radial region obtained by a circumferential groove or cutout provided in the bearing hub 40, it is only contemplated the interruption of the oil film in the first end portion 40a of the bearing hub 40, on which are applied, by the crankshaft 50, the greatest forces derived from compression of the refrigerant gas by the piston.

However, the provision of a compliant region in the first end portion 40a of the bearing hub 40 does not address the issue regarding the increase of torque of the electric motor 70 and the wear by localized contact in the second end portion 40b of the bearing hub 40, at starts of the electric motor 70, with the rotor 71 presenting concentricity deviations in relation to the stator 72.

Besides the fact that the prior art provides only the possibility of compliance in a region of the first end portion 40a of the bearing hub 40, it requires additional machining operations in the crankcase 10, in order to form the region capable to present the compliance, as well as the end radial bearings extensions to be defined in the bearing hub 40.

The localized wear, produced by the operational condition of "inclination" of the crankshaft 50, is high and it is also responsible for the loss of efficiency due to the rupture of the oil film in said bearing regions with a reduced area, often requiring the use of high viscosity oil or bearings with higher load capacity, which tends to increase the losses by viscous friction.

According to the present invention, the first and second end portions 40a, 40b of the bearing hub 40 are each defined by a respective bushing extension 45, 46, fixed in the interior of the bearing hub 40 and presenting an end portion 45a, 46a, which projects axially outwards from the bearing hub 40, so as to be elastically and radially deformed outwardly when pressed by a confronting portion of the crankshaft 50, when the latter presents a coaxiality deviation of its axis Y1 in relation to the axis X1 of the radial bearing 41.

The dimensioning of the radial thickness and axial extension of said end portions 45a, 46a of the bushing extensions 45, 46 is made so as to allow for a desired radial deformation of said end portions 45a, 46a, which is necessary and sufficient to minimize or completely eliminate the mutual contact regions of the crankshaft 50 with the radial bearing 41, in the positioning error condition of the crankshaft 50 already mentioned above.

In other words, each of the end portions 45a, 46a of the bushing extensions 45, 46 defines, with a confronting part of the crankshaft 50 and in the elastically deformed condition, a confronting region CR of surfaces having dimensions, in the axial and circumferential directions, which are capable of maintaining, in said regions, an oil film which separates, at least partially, the surfaces which form said the confronting region (CR) of surfaces.

The compliant regions, in the end portions of the bearing hub 40, allow that the radial deformation of the bushing extensions 45, 46 produces a confronting region CR of surfaces, whose axial and circumferential dimensions are increased from a nominal condition of linear tangency between said parts, to a support condition provided by axial and circumferential extensions sufficient to avoid interruption of the oil film.

Figure 6:
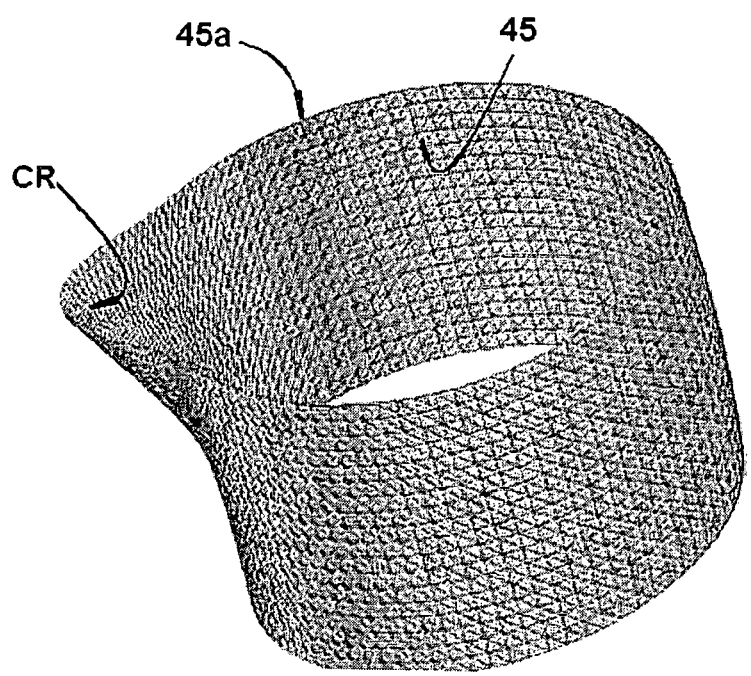
FIG. 6 represents a schematic perspective view of the elastically deformed bearing region, illustrated in FIG. 5.

As illustrated in FIGS. 4, 5 and 6, the confronting region CR of surfaces of the deformed end portion 45a, between the crankshaft 50 and the bushing extension 45, in the first end portion 40a of the bearing hub 40, takes a nearly semi-elliptical form, with its end edge coinciding with the marginal edge of the adjacent end portion 45a of the respective bushing extension 45. It should be understood that the confronting region of surfaces, between the crankshaft 50 and the bushing extension 46, in the second end portion 40b of the bearing hub 40, present, according to the present invention, the same configuration illustrated in FIGS. 5 and 6.

Thus, it can be said that the produces a confronting region CR of surfaces, between the crankshaft 50 and the bushing extensions 45, 46 of the radial bearing 41, in the first and second end portions 40a, 40b of the bearing hub 40, take a nearly semi-elliptical form, with its end edge coinciding with the marginal edge of the adjacent end portion 45a, 46a of the respective bushing extension 45, 46.

Therefore, the solution proposed by the invention allows increasing the effective bearing area between said relatively moving parts of crankshaft 50 and of radial bearing defined by the bushing extensions 45, 46, from a condition of tangential contact in pieces, assumed as rigid, according to a circumferential arc line, to a condition in which said contact occurs according to the confronting region CR of surfaces, which is increased in the axial and circumferential directions.

The increase of the axial dimension of the confronting region CR of surfaces, between the parts of the crankshaft 50 and the parts of radial bearing 41, by means of elastic radial deformation of the end portions 45a, 46a of the bushing extensions 45, 46, provides a better bearing for the crankshaft 50 in its inevitable positioning error conditions, eliminating localized wear and loss of efficiency due to rupture of the oil films, transforming metal-metal friction into viscous friction, in said confronting region CR of surfaces of the tribological pairs.

The dimensions, in the axial and circumferential directions, of said elastically deformable end portions, are determined by the design characteristics of the compressor, the size and operational conditions of the compressor, and by the dimensional tolerances permitted in the manufacturing and assembly processes.

Considering the crankcase 10 as being usually produced in a cast metal alloy, its internal conformation for receiving and retaining the bushing extensions 45, 46 may be made by machining the crankcase 10. As illustrated in FIGS. 2 and 3, the crankcase 10 has its end region, from which projects the eccentric end portion 55 of the crankshaft 50, machined for forming a recess 11 around the radial bearing 41, within which is housed an axial bearing 80, to support the weight of the crankshaft 50 and of the rotor 71 and which may present any adequate construction, such as a roller or a sliding bearing.

However, while the end portion 45a, 46a of the bushing extension 45, 46 may present the same radial thickness of the remainder of the bushing extension 45, 46, it is possible to provide the end portions 45a, 46a projecting axially outwards from the bearing hub 40, with the radial thickness reduced in relation to the largest diameter thereof, when the radial thickness required for the bushing extensions 45, 46 is greater than that necessary to provide, to their respective end portions 45a, 46a, the desired capacity of elastic deformation, when pressed by a confronting portion of the crankshaft 50, which presents a coaxiality deviation of its axis in relation to the axis of the respective part of radial bearing 41. It should be understood that said reduced thickness may be constant or variable, depending on the design characteristics of the compressor.

The fixation of the bushing extensions 45, 46, inside the bearing hub 40, may be made in different ways. As illustrated in FIGS. 2 and 3, the bearing hub 40 may be internally provided with an inner median circumferential projection 48, configured to define a stop for the bushing extensions 45, 46. However, it should be understood that the first and second end portions 40a, 40b of the bearing hub 40 may be defined by respective bushing extensions 45, 46 formed in a single tubular piece with a longitudinal extension compatible with the longitudinal extension of the bearing hub 40. In a constructive variant, also not illustrated, it is possible to provide two bushing extensions, in separate pieces, but which would be mutually and axially confronting in the inner median region of the bearing hub.

In these two cases, it is not provided the inner median circumferential projection 48 illustrated in the construction of FIGS. 2 and 3.

The use of the bushing extensions 45, 46 favors the use of materials other than cast or sintered iron, aluminum or nickel alloys, such as, for example, polymeric materials, iron or nickel alloys with self-lubricating properties, and special coatings which are economically feasible, since said materials may have localized applications in said components.

In the construction illustrated in FIGS. 2 and 3, the bushing extensions 45, 46 are formed in a single material which, as mentioned above, may be iron alloys, aluminum or nickel alloys, or polymeric materials. In case the material is defined in metal alloys, particularly iron or nickel alloys, it may be formed so as to present self-lubricating characteristics defined, for example, by the dispersion of non-metallic solid lubricant material in the metallic matrix.

The bushing extensions 45, 46, may also be formed in a single material defined by an engineering polymer, adequately dimensioned to operate as a radial bearing and also to define the axial projections external to the bearing hub, which are responsible for defining the compliant regions upon occurrence of coaxiality deviation between the crankshaft 50 and the axis X1 of the radial bearing 41.

Regardless of the type of material used for the formation of the bushing extensions 45, 46, the dimensioning of the radial thickness and of the axial extension of said end portions 45a, 46a is made as previously mentioned, to allow for the desired radial deformation of said end portions 45a, 46a in the positioning error condition of the crankshaft 50.

In addition to the constructive aspects mentioned above, it should be understood that the bushing extensions 45, 46, when formed in metal alloys, can receive a surface treatment for reducing wear, such as nitriding, and/or for reducing the friction coefficient, such as diamond-like carbon deposition (DLC-Diamond Like Carbon) or other material by physical deposition (PVD-Physical Vapour Deposition).

The bushing extensions may also be constructed in more than one material such as, for example, a material comprising an inner anti-friction layer AF, obtained in a polymeric material such as, for example, PTFE (polytetrafluoroethylene), which is housed and retained within a jacket S, in a metallic material and to be equally affixed inside the bearing hub 40, as schematically illustrated in FIGS. 4 and 5.

Further according to FIGS. 2 and 3, the end portion of the larger eye 61 of the connecting rod 60, facing the crankcase 10, may be defined by a bushing extension 65 affixed in the interior of the larger eye 61 and presenting an end portion 65a, which projects axially outwards from the larger eye 61, so as to be elastically and radially deformed outwardly when pressed by a confronting portion of the eccentric end portion 55 of the crankshaft 50 which presents a coaxiality deviation of its axis Y2 in relation to the axis X2 of the larger eye 61.

As already described in relation to the radial bearing 41, the end portion 65a of the bushing extension 65 defines, with the confronting portions of the eccentric end portion 55 of the crankshaft 50, and in the elastically deformed condition, the confronting region CR of surfaces, having dimensions, in the axial and circumferential directions, capable of maintaining, in said regions, an oil film which separates, at least partially, the surfaces which form said confronting region CR of surfaces.

The end portion 65a of the bushing extension 65 may present the same radial thickness of the remainder of the bushing extension 65, or a reduced radial thickness, as already described with respect to the bushing extensions 45, 46 associated with the radial bearing 41.

Further as previously described regarding the bushing extensions 45, 46 of the radial bearing 41, the confronting region CR of surfaces, in the case of the bushing extension 65 of the larger eye 61, takes a nearly semi-elliptical form, with its end edge coinciding with the adjacent marginal edge of the end portion 65a of the respective bushing extension 65 mounted in the interior of the larger eye 61.

Also as previously described in relation to the bushing extensions 45, 46 of the radial bearing 41, the end portion 65a of said bushing extension 65 may present a radial thickness which is reduced in relation to that of the remainder of the respective bushing extension 65, which reduced thickness may have a constant or variable value.

It should also be understood that the bushing extension 65 of the larger eye 61 can be made in the same manner and with the same material variations, as already described above with respect to the bushing extensions 45, 46 of the bearing hub 40.

It should also be noted that the constructive variants described herein may be presented either individually, in particular constructions, or also partially or totally combined with each other.

While the invention has been described herein with reference to the construction illustrated in the enclosed drawings, it should be understood that the present arrangements may be applied to other possible compressor constructions, without departing from the inventive concept defined in the claims that accompany the present specification.

The invention claimed is:

1. A refrigeration reciprocating compressor comprising: a crankcase including a cylinder and a bearing hub defining a radial bearing; a crankshaft mounted in the radial bearing and having an eccentric end portion and a free end portion which project outwards from a first end portion and a second end portion, respectively, of the bearing hub; a piston housed in the cylinder; a connecting rod coupling the eccentric end portion of the crankshaft to the piston, said refrigeration reciprocating compressor being characterized in that the first end portion and second end portion of the bearing hub are each defined by a respective bushing extension affixed in the interior of the bearing hub and each bushing extension having an end portion, which projects axially outwards from the bearing hub, so as to be elastically and radially deformed outwardly when pressed by a confronting portion of the crankshaft, which presents a coaxiality deviation of its axis in relation to the axis of the radial bearing.

2. The refrigeration reciprocating compressor, as set forth in claim 1, characterized in that each of the end portions of the bushing extensions defines, with a confronting part of the crankshaft, a confronting region of surfaces having dimensions, in the axial and circumferential directions, capable of maintaining, in said regions, an oil film which separates, at least partially, the surfaces which form said confronting region of surfaces.

3. The refrigeration reciprocating compressor, as set forth in claim 2, characterized in that the confronting region of surfaces takes a semi-elliptical form.

4. The refrigeration reciprocating compressor, as set forth in claim 1, in which the connecting rod has a large eye mounted around the eccentric end portion of the crankshaft and being coupled, by a small eye arranged in an opposite end of the connecting rod, to the piston, characterized in that the end portion of the large eye of the connecting rod, facing the crankcase, is defined by a bushing extension affixed in the interior of the large eye and presenting an end portion, which projects axially outwards from the large eye.

5. The refrigeration reciprocating compressor, as set forth in claim 4, characterized in that the end portion of the bushing extension defines with the confronting portion of the eccentric end portion of the crankshaft a confronting region of surfaces, having dimensions, in the axial and circumferential directions, capable of maintaining, in said regions, an oil film which separates, at least partially, the surfaces which form said confronting region of surfaces.

6. The refrigeration reciprocating compressor, as set forth in claim 5, characterized in that the end portion of the bushing extension presents the same radial thickness of the remainder of the bushing extension.

7. The refrigeration reciprocating compressor, as set forth in claim 4, characterized in that the confronting region of surfaces takes a semi-elliptical form.

8. The refrigeration reciprocating compressor, as set forth in claim 1, characterized in that at least one of the bushing extensions is made in a metal alloy selected from iron, aluminum and nickel.

9. The refrigeration reciprocating compressor, as set forth in claim 8, characterized in that at least one of the bushing extensions is provided with a surface treatment for reducing wear and/or the friction coefficient.

10. The refrigeration reciprocating compressor, as set forth in claim 1, characterized in that at least one of the bushing extensions is made in a self-lubricating material defined by a metallic alloy matrix incorporating a dispersion of non-metallic solid lubricant.

11. The refrigeration reciprocating compressor, as set forth in claim 1, characterized in that at least one of the bushing extensions is formed in a single material defined by an engineering polymer.

12. The refrigeration reciprocating compressor, as set forth in claim 1, characterized in that at least one of the bushing extensions comprises an inner antifriction layer, obtained in a polymeric material and which is housed and retained in the interior of a jacket in a metallic material and to be affixed inside the bearing hub.

* * * * *

UNITED STATES PATENT AND TRADEMARK OFFICE
CERTIFICATE OF CORRECTION

PATENT NO. : 9,611,888 B2  Page 1 of 1
APPLICATION NO. : 14/432306
DATED : April 4, 2017
INVENTOR(S) : Adilson Luiz Manke et al.

It is certified that error appears in the above-identified patent and that said Letters Patent is hereby corrected as shown below:

On the Title Page

Item (30) Foreign Application Priority Data should read:

(30)    Foreign Application Priority Data

Oct. 1, 2012 (BR).....................................10 2012 025039

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*